J. WILLIAMS.

Fruit Drier.

No. 9,620. Reissued March 22, 1881.

Witnesses.
F. L. Durand
[illegible]

Inventor.
John Williams
by his Attorneys
Eils & Dodlitt

UNITED STATES PATENT OFFICE.

JOHN WILLIAMS, OF KALAMAZOO, MICHIGAN.

FRUIT-DRIER.

SPECIFICATION forming part of Reissued Letters Patent No. 9,620, dated March 22, 1881.

Original No. 143,949, dated October 21, 1873; Reissue No. 7,500, dated February 6, 1877. Application for reissue filed January 31, 1881.

*To all whom it may concern:*

Be it known that I, JOHN WILLIAMS, a citizen of the United States, formerly of South Haven, but now a resident of Kalamazoo, in the county of Kalamazoo and State of Michigan, have invented certain new and useful Improvements in Fruit-Driers; and I do hereby declare the following is a full, clear, and exact description of the invention, that will enable others skilled in the art to which it appertains to make and use the same, reference being had to the accompanying drawings, and to the letters of reference marked thereon, which form a part of this specification.

Figure 1:
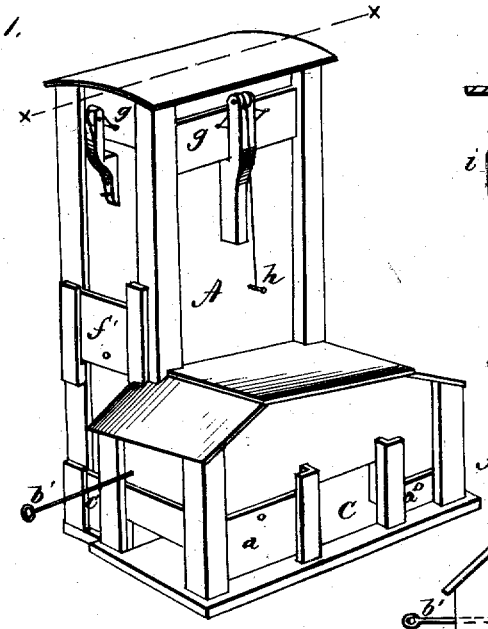
Figure 2:
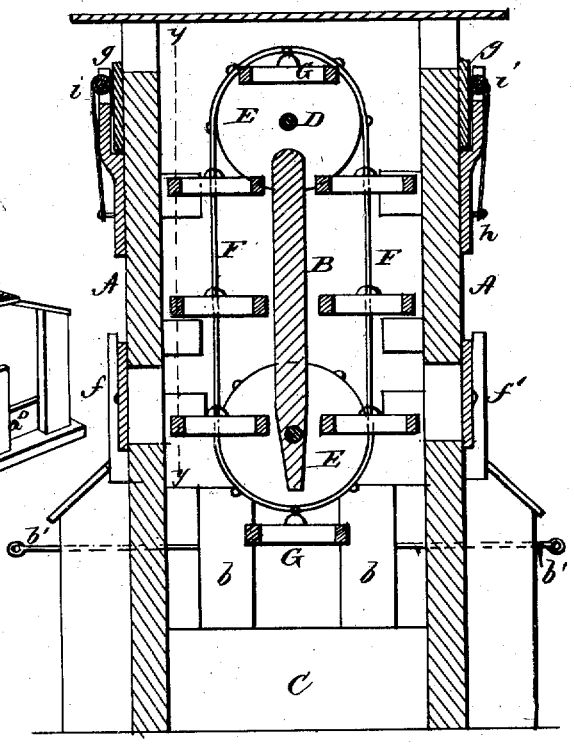
Figure 3:
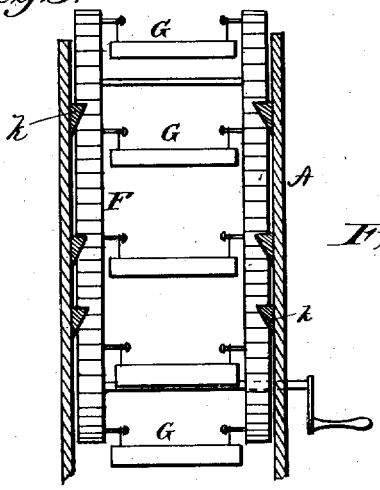
Figure 4:
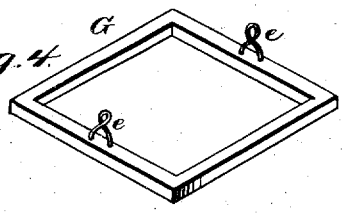
Figure 5:
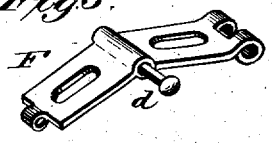

Figure 1 is a perspective view of my drier. Fig. 2 is a vertical section taken on the line *x x* in Fig. 1. Fig. 3 is a cross-section of a flue on *y y* in Fig. 2, showing in elevation the inner face of the end wall thereof. Fig. 4 is a perspective view of one of the frames which are suspended between the chains for receiving the fruit to be dried. Fig. 5 is a perspective view of a pair of links from one of the endless chains.

Like letters refer to like parts in the several figures.

This invention consists of an improved process of drying fruits, vegetables, and other articles of food, the distinctive feature of which is to subject the fruit—for instance, at the beginning of the process—for a short time to a high degree of heat, to prevent the acetous fermentation of the fluids of the fruit, and thus to preserve it.

In reducing my improved process, hereinafter more fully described, to practice, I also devised an improved apparatus for practicing the process. This apparatus consists in a vertical shaft or trunk communicating at its base with a chamber in which air passing through it into the trunk is heated, which trunk is divided by a vertical partition into two rectangular flues. A pair of chain-wheels have their shaft journaled in the trunk-walls parallel with and above the partition, and a second pair of chain-wheels in like manner have their shaft journaled below the said partition. Over these wheels run two endless chains, whose links have projecting pins at intervals, upon which to suspend frames upon which are placed perforated or wire-cloth trays containing the fruit to be dried, which trays, in the rotation of the chain-wheels, are first carried up one flue and down the other before removal at the completion of the process, the trunk being provided with devices for regulating the admission of cold air to either flue, and for regulating the emission of the escaping currents at the top of the flues, all being arranged to operate as more fully hereinafter set forth.

In the drawings, A represents a rectangular trunk, partially divided by a partition, B, into two flues. Below and in front of the trunk I place a heating-chamber, C, communicating therewith by an opening extending across the front wall of said trunk. Within the chamber may be placed a stove or furnace, of any style preferred, to heat the cold air entering the chamber through openings in the front and sides, which are provided with sliding covers *a*, to regulate the admission, or to shut it off at any one or more of the entrances, as may be required. *b b* are two sliding doors, whose united width equals the breadth of one of the flues, which doors are moved by the rods *b'* across the opening which is made in the front wall of the trunk at the base of the flues. By these doors I can direct the entire volume of heated air into either flue, or I can shut it off from one flue, or partially from both. At the base of the trunk cold-air inlets are provided, which may be closed or their area of opening adjusted by slides *c*. These openings are made in the end and back walls of the trunk.

D is a shaft journaled in brackets in the front and back walls of the trunk, just above the top of the partition, and carries near each end a chain-wheel, E. A similar shaft is in like manner journaled just above the lower end of the partition, and also carries a pair of chain-wheels. The diameter of the chain-wheels is such that the periphery of each extends midway across the flue at each side of the partition.

F F are two endless chains moving with and around the chain-wheels, the lower shaft being rotated by a crank on its rear end, which extends through the back wall of the flue to receive it, and is also provided with a ratchet and pawl of ordinary construction, to hold it and the chains at whatever position they may be left in.

At intervals in the length of each chain a pin, *d*, which pivots the links together, is elongated, as in Fig. 5, to receive the bail *e* of a light frame, G, at each end thereof, which frames are thereby suspended from the chains in the flues. Each frame receives a tray of wire-cloth or sheet metal having numerous perforations, the trays being introduced and placed on the frames through an opening, *f*, in the end wall of one flue, and removed through an opening, *f'*, opposite thereto in the end wall of the other flue, both openings having doors to close them.

In the tops of the four walls of the trunk, directly under the projecting roof, openings are provided for the escape of warm currents of air laden with moisture absorbed from the fruits in contact with which they have passed. Each opening is provided with a door, *g*, sliding in grooves in the corner-posts, which door may be raised or lowered to close or open it more or less by a cord, *h*, passing over a bracket-pulley, *i*, operated by the attendant below, so that the heat may be retarded in its passage through the flues or be permitted to escape freely, as circumstances may require. If preferred, the roof of the trunk may be so arranged that it can be raised above the top of the trunk to answer the purpose.

On the front and back walls of each flue I place deflectors *k*, at distances apart equal to the space from one frame on the chains to the next, for the purpose of directing the heated ascending currents from the ends of one tray toward the middle of the next one; or they may alternate in position, to direct the current passing up at one end of a tray toward the opposite end of the next one above.

The fruit, being thinly and evenly spread upon the trays, is subjected uniformly to the action of the heated currents, parts of which pass up through the fruit and parts sent across the top of it by the deflectors, the intensity of the heat being the greatest, however, at the commencement and close of the process. The flue in which the fruit is introduced has the greater volume of heated air directed into it, which, impinging upon the fruit upon the lower trays, at once arrests the acetous fermentation, which would otherwise take place if the fruit were subjected to a slow process of evaporation of its moisture, and for this purpose I make the temperature of the current as near 250° Fahrenheit as possible. If the fruit remained but a short time subject to this temperature, it would be cooked; but, on the contrary, it is quickly moved upward, and trays containing fresh fruit are introduced and interposed between it and the direct impact of the ascending current.

The fruit, as it ascends the flue, is subjected to the action of currents of lesser temperature, which drive off the moisture contained in them gradually until the trays begin to descend the other flue, when the dehydrating process becomes more rapid as the bottom of the flue is approached, care being taken to admit to the bottom of that flue enough cold dry air through its registers to temper the intense heat of the heated current to a point that will not allow it to burn or scorch the fruit, which, when removed, is most thoroughly desiccated, leaving it ready for market in a form that is unchangeable under variations of temperature or hygrometric conditions of the atmosphere; and to make it ready for use all that is required is to soak it in water until it has absorbed a volume equal to that of which it had been deprived, when it will be found to possess all its natural flavor, aroma, and color.

I am aware that Francis H. Smith, Charles Alden, and others have invented certain processes for dehydrating, supermaturating, and producing certain other chemical results and changes of a highly scientific character in the fruits treated by their processes, with a view to their preservation; and while I disclaim any lot or part in their said inventions, I wish to point out the fact that I treat the fruit by the simple and well-known method of drying it by subjecting it to the action of dry heated air, with this distinctive feature that, to prevent the acetous fermentation of the fluids of the fruit at the beginning of the process, I subject it for a short time to a high degree of dry heat at a temperature of about 250° Fahrenheit for the purpose of thus preserving it.

When desiccating tomatoes and overripe fruits, which require great care in handling, if preferred, they may be steamed for a short time before placing them in the flue, instead of subjecting them to high temperature in the flue to prevent the fermentation referred to.

What I claim as my invention, and desire to secure by Letters Patent, is—

1. In the process of preserving and drying fruit and vegetables by dry artificial heat, the step of arresting acetous fermentation and thus preserving the substances by subjecting them, at the beginning of the process, for a short time to a preserving-heat, substantially as before set forth.

2. The process of preserving and drying fruit and vegetables which consists of the following steps, viz.: first, subjecting the substances to a hot preserving atmosphere to arrest fermentation and decomposition; and, secondly, passing them from said preserving atmosphere through air which first gradually decreases in temperature and then gradually increases in temperature, substantially as before set forth.

3. The air-chamber A, divided into two flues, each independently ventilated by means of dampers at top and bottom, and combined with a heating-chamber for drying fruit and the like, substantially as described.

4. The divided and ventilated air-chamber A, provided with the endless tray-carriers F, in combination with the heating-chamber C, arranged at the lower end of the said air-chamber and communicating directly therewith, in the manner described.

5. A fruit-drying chamber provided with deflectors *k k*, in combination with the traveling trays, substantially as and for the purpose described.

6. The combination, in a fruit-drier, of the slides or dampers *c c* with the heating-chamber and the divided air-chamber, whereby the admission of heat to the flues of said air-chamber is regulated, substantially as and for the purpose specified.

7. The sliding covers *a*, in combination with the sliding doors or dampers *b b* and slides *c*, substantially as and for the purpose specified.

8. The air-trunk A, having partition B and adjustable openings in its upper part, shafts D D, chain-wheels and endless chain F, frames G, and dampers *b b*, as described.

In testimony whereof I affix my signature in presence of two witnesses.

JOHN WILLIAMS.

Witnesses:
C. A. NEALE,
CHAS. S. HYER.